(12) United States Patent
Bourcier et al.

(10) Patent No.: US 6,512,642 B1
(45) Date of Patent: Jan. 28, 2003

(54) METHOD AND STRUCTURE FOR ALIGNING OPTICAL ELEMENTS

(75) Inventors: Roy J. Bourcier, Corning, NY (US); Russell A. Crook, Hellertown, PA (US); William G. Faber, Elmira, NY (US); Dominick J. Forenz, Hammondsport, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/902,002

(22) Filed: Jul. 10, 2001

(51) Int. Cl.[7] ............................. G02B 7/02; G02B 6/32; G02B 6/38
(52) U.S. Cl. .................. 359/813; 359/811; 359/819; 359/822; 385/34; 385/74; 29/464
(58) Field of Search .................... 359/811, 813, 359/819, 822, 393; 385/34, 33, 35, 74, 78, 79; 29/464, 73

(56) References Cited

U.S. PATENT DOCUMENTS

| | | | | | |
|---|---|---|---|---|---|
| 4,652,095 | A | * | 3/1987 | Mauro | 359/393 |
| 5,793,540 | A | * | 8/1998 | Ohtsuki et al. | 359/819 |
| 5,970,597 | A | * | 10/1999 | Bedzyk et al. | 29/464 |
| 6,163,417 | A | * | 12/2000 | Nunnally | 359/822 |
| 6,320,706 | B1 | * | 11/2001 | Richard et al. | 359/822 |

\* cited by examiner

*Primary Examiner*—Loha Ben
(74) *Attorney, Agent, or Firm*—Eric M. Smith

(57) ABSTRACT

The present invention relates to a five-degree of freedom alignment structure 10 for an optical element 28. The alignment structure 10 is a two piece assembly including a submount 12 and a support member 18. An optical element 28 is coupled to the mounting surface 14 of submount 12. The alignment structure 10 is used to align the optical axis 34 of the optical element 28 with the optical axes 32 of another optical element 30.

18 Claims, 11 Drawing Sheets

METHOD AND STRUCTURE FOR ALIGNING OPTICAL ELEMENTS

BACKGROUND OF THE INVENTION

1. Field of the Invention

The present invention relates generally to aligning optical elements, and particularly to a bonded alignment structure for optical elements.

2. Technical Background

In the assembly of optical devices it is often desirable to use free space optics to allow two optical elements to engage in optical communication with one another. Each optical element may be thought of as having an optical axis. In order for the optical elements to engage in efficient optical communication with one another the optical elements must be optically aligned with one another. Typically optical alignment consists of aligning the optical axes of two or more optical elements so that an optical signal following a desired optical path through the optical elements possesses certain characteristics. Optical alignment requires rotating and translating the optical elements in 3-space to bring their respective optical axes in to a predetermined degree of alignment. For example, placing a lens in the path of a laser beam so that the lens performs an optical operation, such as collimating or focusing, on the laser beam.

Alignment and structural attachment of miniature photonic optical elements, including lenses, mirrors and fibers, has proven difficult. Many optical elements have optical tolerances that are sufficiently large enough to allow passive alignment of the optical components. The optical tolerances of many optical elements, however, are too small to allow passive alignment. The assembly of these optical elements into optical devices requires active alignment. Active alignment may be defined as placing at least two optical elements in optical communication with one another and repositioning at least one of the optical elements until some characteristic of the optical signal has a predetermined value. Typically, active alignment is accomplished by moving one of the optical elements relative to the other optical elements while measuring the intensity of the optical signal received by one of the optical elements.

The active alignment process may be complicated by the fact that the structural assembly must allow the optical elements to be both aligned and fixed in place without inducing unacceptable shifts in location of the optical element. Active positioning is comparatively expensive and is often difficult to implement due to the limited space inside photonic packages. Captive positioning is desirable, but designs often require a high degree of mechanical complexity and have relatively large tolerances.

There is a need for a relatively simple captive alignment structure capable of obtaining the tight tolerances necessary for optical alignment while minimizing the shift in location of the optical components during attachment.

SUMMARY OF THE INVENTION

The present invention is directed towards methods and structures for mounting optical components that require active alignment.

One embodiment of the present invention is a method for mounting an optical element using five (5) Cartesian degrees of freedom. The method for mounting an optical element includes the step of selecting an optical element to be mounted for optical communication with another optical element. The method also includes the step of coupling the optical element to a submount. The method further includes forming a mounting assembly by selecting a support block having at least two non-coplanar surfaces and coupling the support block to the submount. The optical element is then positioned for optical communication with another optical element by selectively manipulating the position of the submount and the support block to align the optical element with at least one other optical element. The relative position of the submount and the support block with respect to the other optical element are then fixed.

In another embodiment, the present invention includes a mount for an optical element. The mount includes a support member having an anchor surface slidable on a substrate and a alignment surface at an angle to the anchor surface. The mount further includes a submount having a bonding surface and a mounting surface. The bonding surface and the mounting surface are at an angle to one another. The bonding surface is coupled to the alignment surface of the support block and the optical element is coupled to the mounting surface of the submount.

In another embodiment, the present invention includes a mount for an optical element. The mount includes a submount and two support blocks. The submount has two parallel surfaces and the two support blocks are placed to slidably engage the two parallel surfaces. The optical element is coupled to the submount. The submount and two support blocks are arranged so that the submount is rotatable about an axis perpendicular to the two parallel surfaces and is translatable in a plane parallel to the two parallel surfaces. The optical element is positioned to engage in optical communication with at least one other optical element by selectively rotating the submount about two non-parallel axes and translating the submount in three orthogonal directions.

One advantage of the present invention is that it provides a mount for an optical element adjustable in five (5) degrees of Cartesian freedom.

Another advantage of the present invention is that the adhesive bonds may be thoroughly cured without thermal distortion.

Another advantage of the present invention is that it has a relatively low vertical profile which is important in the packaging of active opto-electronic devices.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
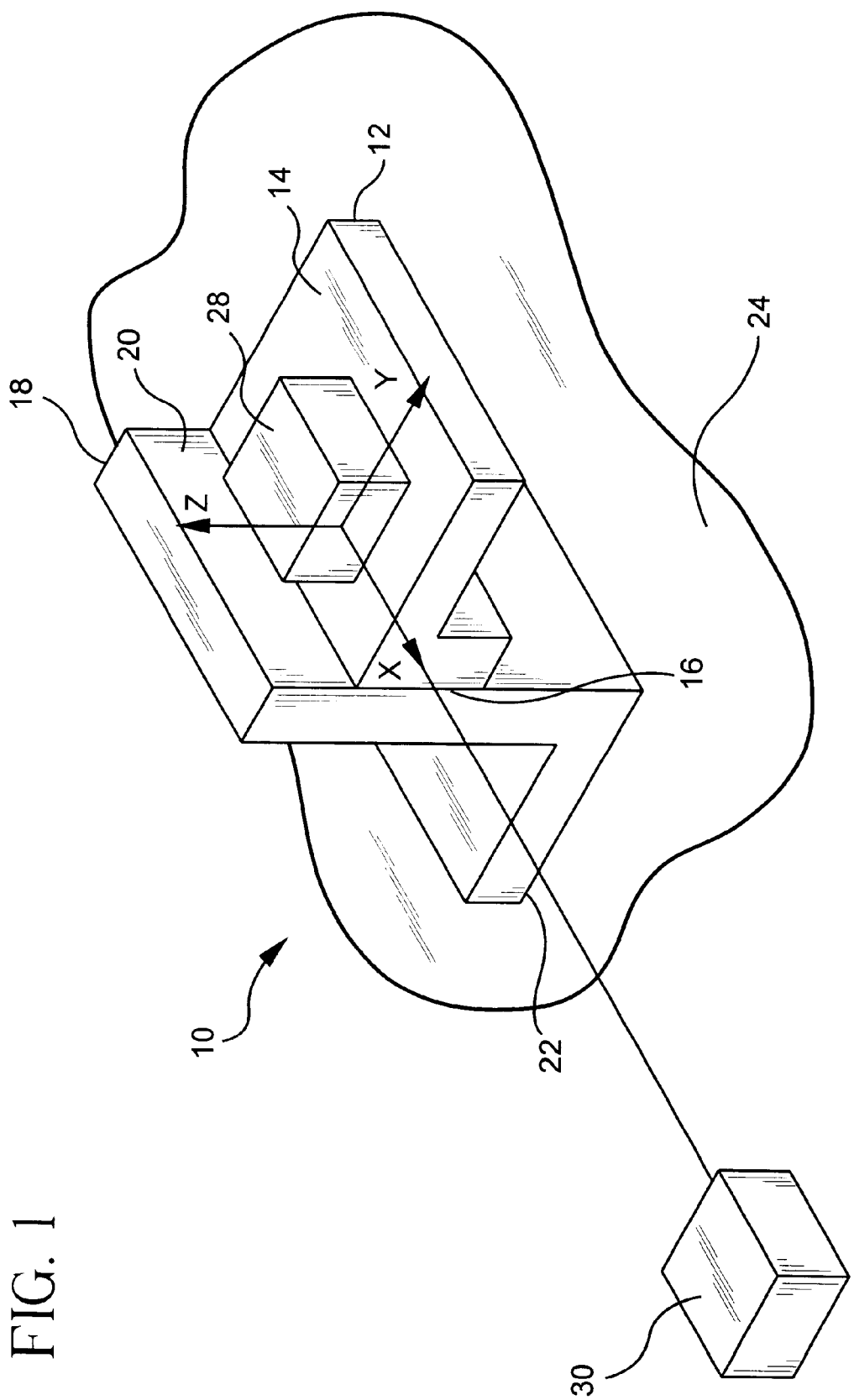
FIG. 1 is a perspective view of an alignment structure in which the present invention is embodied.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the alignment structure of the present invention is shown in FIG. 1, and is designated generally throughout by reference numeral 10.

As embodied herein and depicted in FIG. 1, the alignment structure 10 is a five-degree of freedom mount for an optical element 28. The alignment structure 10 is a two piece assembly including a submount 12 and a support member 18. An optical element 28 is coupled to the mounting surface 14 of submount 12. The alignment structure 10 is used to align the optical axis 34 of the optical element 28 with the optical axes 32 of another optical element 30. The optical element 30 may be. adjustable in position or fixed in position, for the purposes of this illustrative example of a two piece alignment structure 10 embodiment of the present invention set forth herein, the position of the optical element 30 will be assumed to be fixed in space relative to the optical element 28 mounted to the alignment structure 10. It will be apparent to those skilled in the art that the following detailed description of an embodiment of the alignment structure 10 of the present invention is also applicable when the position and orientation of the optical element 30 is adjustable. Both of the optical elements 28, 30 are shown as generic three-dimensional rectangular structures for illustrative purposes in FIG. 1. The optical elements 28, 30 may, however, have any geometric shape. The optical elements 28, 30 may be, for example, lenses, collimators, optical fibers, a light-emitting device, such as for example a laser or a diode, or a light receiving device, such as, for example a photodetector. The preceding list is merely illustrative of a small number of optical elements and is intended merely to show the broad scope of applicability of the present invention and should not be considered a limitation of the invention. The present invention may be utilized for aligning the various components of any free space optical system.

Figure 1A:
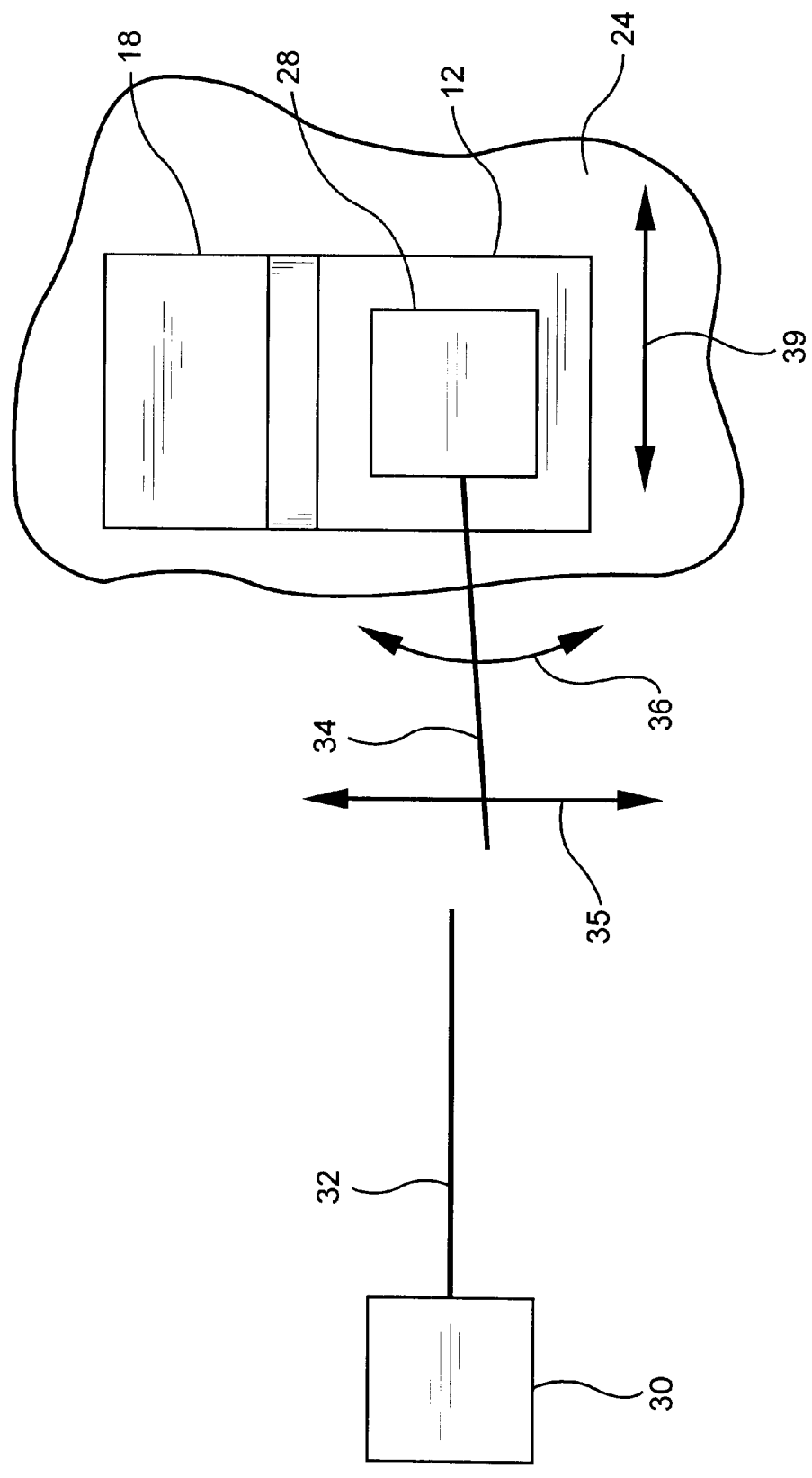
FIG. 1A is a top plan view of the alignment structure shown in FIG. 1.
Figure 1B:
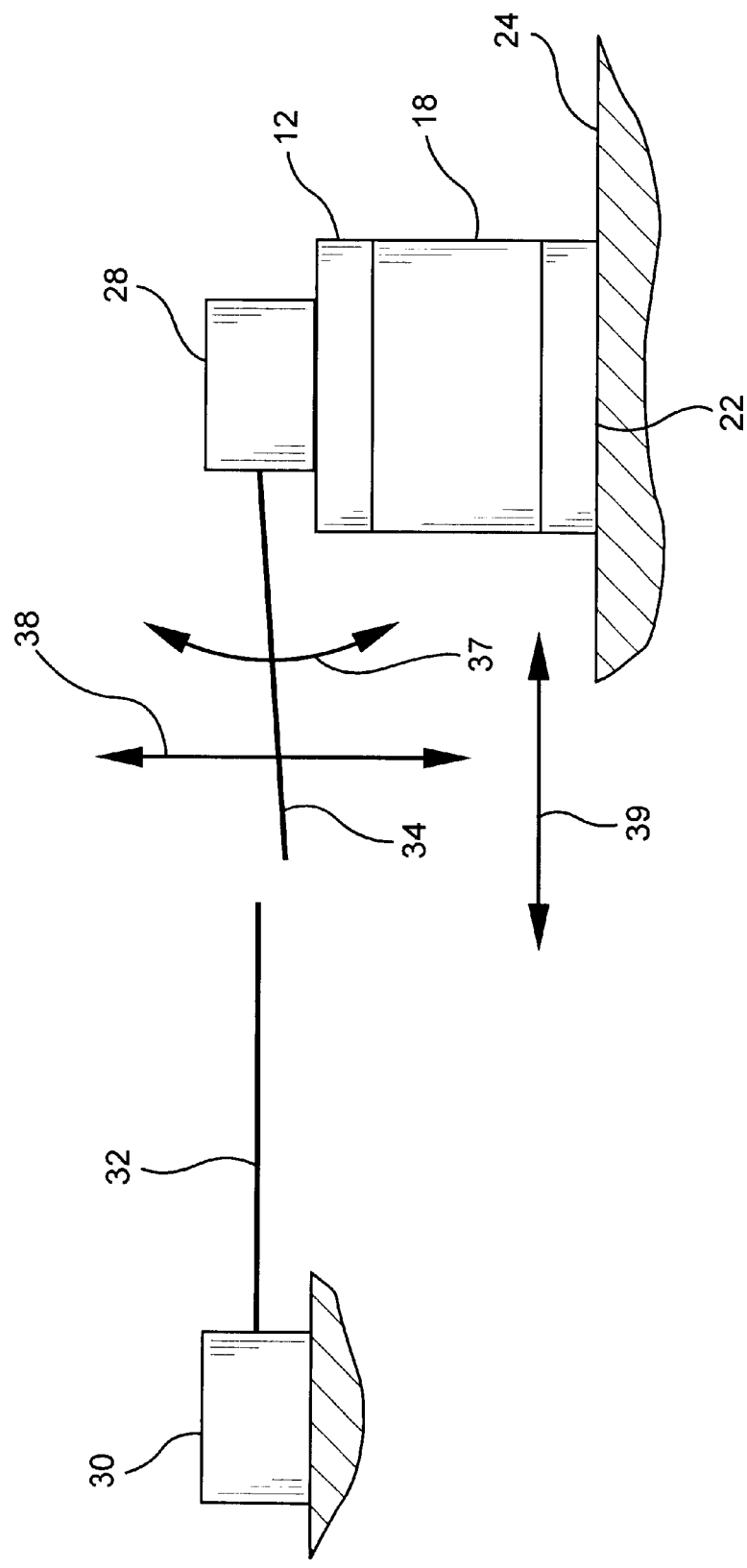
FIG. 1B is a side elevation view of the alignment structure shown in FIG. 1.
Figure 1C:
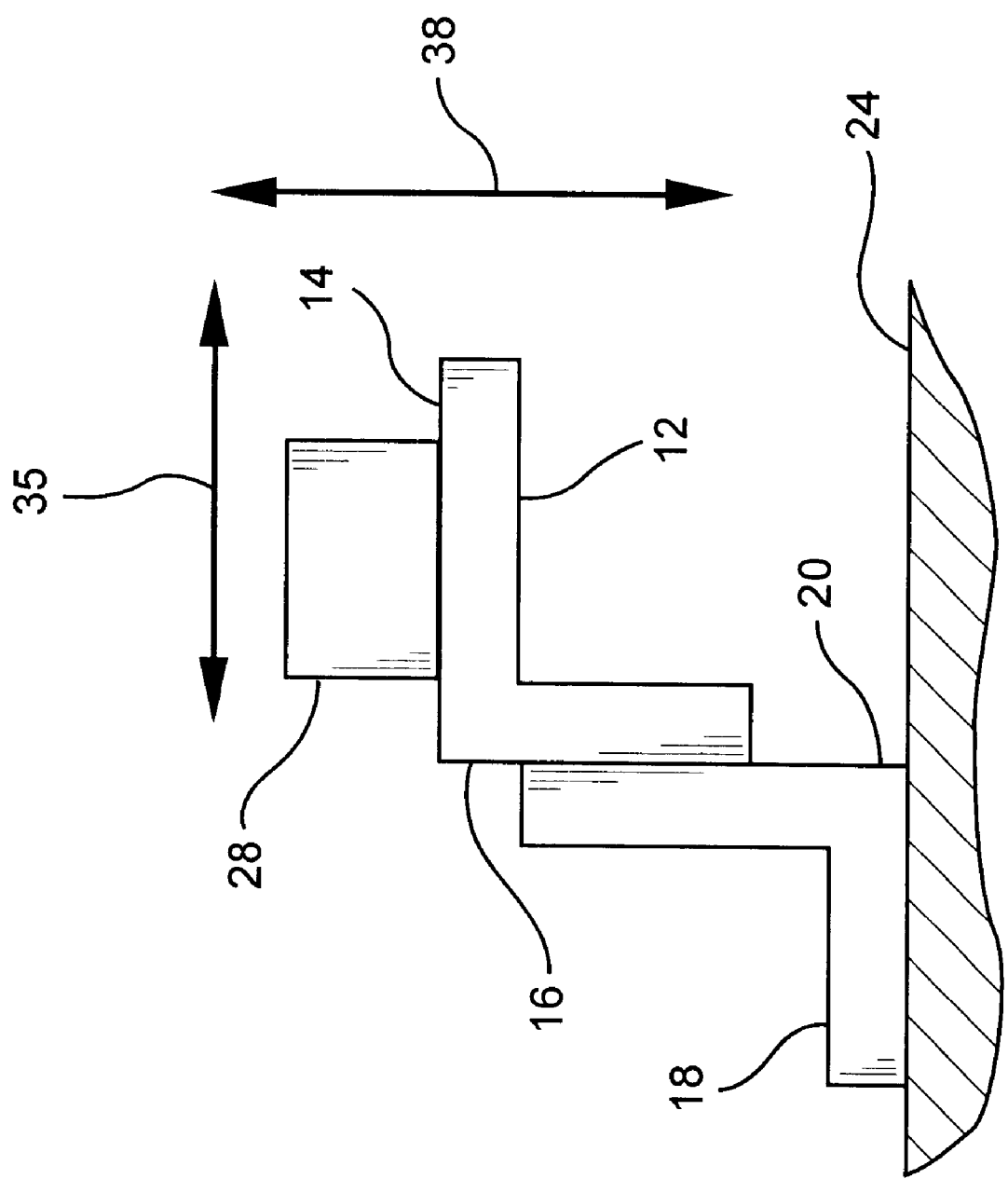
FIG. 1C is a front elevation view of the alignment structure shown in FIG. 1.

The support member 18 is configured for engagement with a substrate 24. The support member 18 includes an anchor surface 22. In one embodiment, for use when the substrate 24 is a planar surface, the anchor surface 22 is configured to allow the alignment structure 10 to move in the directions indicated by the arrows 35, 39 shown in FIGS. 1A and 1B and to be rotated in the direction indicated by the arrow 36.

Typically, the substrate 24 is a planar surface of an optical platform, for example, the interior floor of a butterfly package for a laser.

Figure 4:
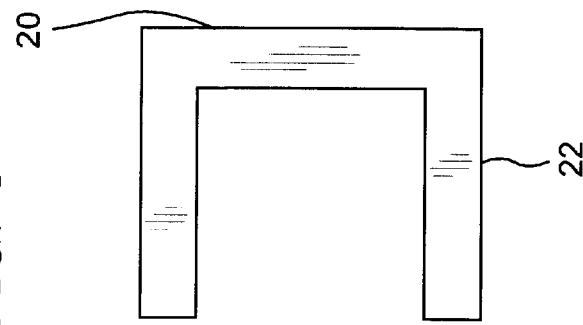
FIG. 4 is a side elevation view of an alternative embodiment of the support member shown in FIG. 1.
Figure 3:
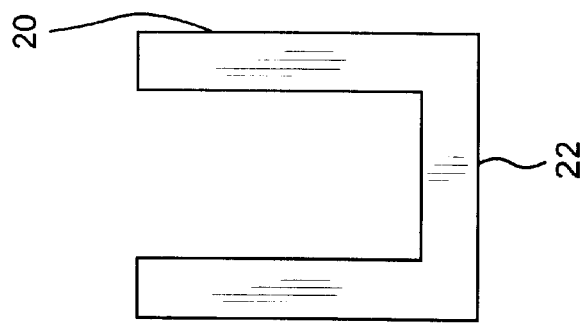
FIG. 3 is a side elevation view of an alternative embodiment of the support member shown in FIG. 1.
Figure 2:
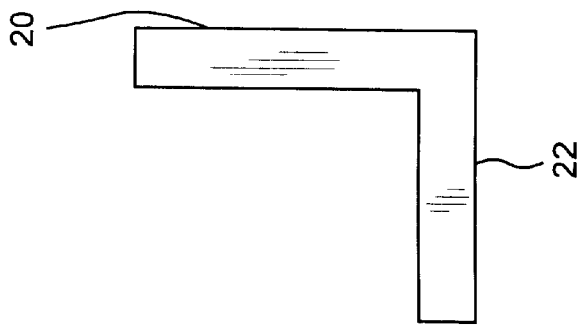
FIG. 2 is a side elevation view of the support member shown in FIG. 1.

The support member 18 has an alignment surface 20 and an anchor surface 22. Preferably the alignment surface 20 and the anchor surface 22 are substantially planar surfaces that are orthogonal to one another. The anchor surface 22 has a flatness and surface finish that facilitate positioning the alignment structure 10 on the substrate 24 and the coupling of the anchor surface 22 to the substrate 24. For example, when the support member 18 is made of glass the anchor surface 22 could be ground to provide a suitable finish and flatness. The finish and flatness of the anchor surface 22 depend on the bonding agent used and the detailed design specification of the alignment structure 10. The surface finish and the flatness of the anchor surface 22 required for a specific installation of this embodiment of the present invention may be readily determined by those skilled in the art. FIGS. 2, 3 and 4 illustrate examples of possible support member geometries. The submount 12 includes a mounting surface 14 and a bonding surface 16. Preferably the mounting surface 14 and the bonding surface 16 are orthogonal to one another. The submount 12 is coupled to a support member 18 using a liquid, light curable adhesive. The adhesive is applied between the alignment surface 20 and the bonding surface 16. Preferably, the adhesive has a viscosity less than about 250 centipoise (cps). For example, UV15 adhesive, available from Master Bond Inc. of Hackensack, N.J., has a viscosity in the range from about 120 cps to about 150 cps. Curing of the adhesive is not initiated until the optical elements 28, 30 are brought into final alignment with one another. The use of a light curable adhesive minimizes thermal expansion induced distortion of the alignment structure and can yield aligned structures with no more than submicron shifts in the spatial orientation of the optical element 28 during the curing cycle.

Before curing the adhesive between the submount 12 and the support member 18 vertical position (Z direction) of the submount 12 is easily adjusted by sliding the submount 12 up and down on the alignment surface 20 of the support member 18. Thus the alignment structure 10 provides three translational degrees of freedom for aligning the optical elements 28, 30.

Furthermore, the support member 18 may be rotated on the substrate 24 about an axis perpendicular to the substrate24 , thereby allowing lateral angular alignment of the optical element 28. Additionally, the submount 12 may be rotated about an axis perpendicular to the Z-axis. Therefore, the alignment structure 10 possesses five degrees of freedom for aligning the optical element 28.

A light curable adhesive having a viscosity less than about 250 centipoise (cps), for example, UV15 adhesive, available from Master Bond Inc. of Hackensack, N.J. is placed between the substrate 24 and the anchor surface 22 of the support member 18. The light curable adhesive may be placed between the substrate 24 and the anchor surface 22 of the support member 18 either before or after the alignment process is begun. Final adjustments to the alignment structure 10 are made and the alignment structure 10 is fixed in place by irradiating it with of the appropriate wavelength and intensity until the adhesive between the substrate 24 and the anchor surface 22 and the adhesive between the bonding surface 16 and the alignment surface 20 is cured. Preferably both the support member 18 and the submount 12 are made from a material that is transparent to the required light.

As depicted in FIG. 1, FIG. 1A, FIG. 1B and FIG. 1C both the submount 12 and the support member 18 are L-shaped members, however, the submount 12 and the support block may be of any shape having two surfaces inclined with respect to one another. In the preferred embodiment of the submount 12 of the alignment structure 10 of the present invention has two orthogonal planar surfaces. Similarly, the support block may be of any shape having two surfaces inclined with respect to one another. In a preferred embodiment, the support member 18 of the alignment structure 10 of the present invention has two orthogonal planar surfaces. The orthogonal surfaces of the submount 12 and the support member 18 allows the optical element 28 to be aligned with another optical element 30 so that movement of the support member 18 on the substrate 24 does not effect the vertical alignment of the optical element 28 with the stationary optical element 30. Similarly, vertical (Z direction) or longitudinal (X direction) movement of the submount 12 with respect to the support member 18 by sliding the bonding surface 20 along the alignment surface 20 does not effect the lateral (Y direction) alignment of the optical element 28 with respect to the stationary optical element 30. In accordance with the invention, the present invention for an optical alignment structure includes a submount 12, examples of which are illustrated in FIG. 5 through FIG. 10.

Figure 5:
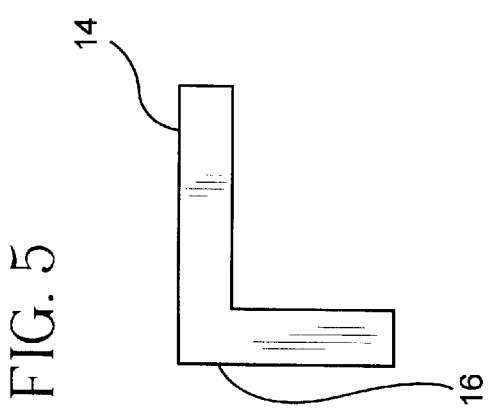
FIG. 5 is a side elevation view of an alternative embodiment of the submount shown in FIG. 1.

As embodied herein and depicted in FIG. 5, the submount 12 is an L-shaped member including a mounting surface 14 and a bonding surface 16. The mounting surface 14 may be a planar surface, a curved surface, a grooved surface or any other type of surface that an optical element may be attached to. A planar surface is particularly suitable for the mounting of optical elements having a flat surface; examples of which are prismatic lenses and certain types of thin film filters.

The bonding surface 16 is preferably a substantially planar surface. The surface roughness of the bonding surface is such to facilitate the adhesive coupling of the submount to a support member 18. The bonding surface preferably has an area in the range from about 1 square millimeter to about 25 square millimeters. The mounting surface 14 and the bonding surface 16 are at some angle to one another, preferably the mounting surface 14 and the bonding surface 16 are perpendicular to one another.

Figure 6:
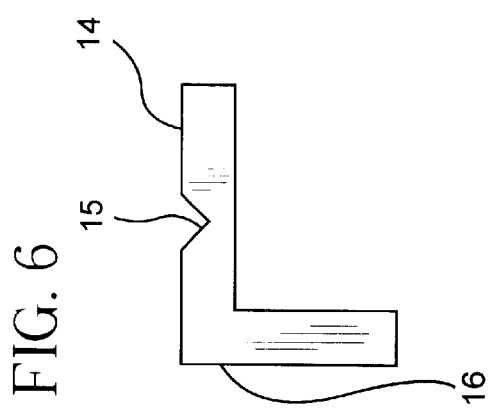
FIG. 6 is a side elevation view of an alternative embodiment of the submount shown in FIG. 1.

In another alternative embodiment, as embodied herein and as shown in FIG. 6, the submount 12 is a L-shaped member having a mounting surface 14 and a bonding surface 16. Preferably the mounting surface 14 and the bonding surface 16 are orthogonal to one another. The mounting surface 14 includes a groove 15. The groove 15 is configured for engagement with an optical element, for example a glass ferrule attached to an optical waveguide fiber device. Typically the optical axis of the optical element, for example an optical waveguide fiber in a glass ferrule, coupled to the submount is parallel to the groove 15. Preferably, the groove 15 is parallel to the bonding surface 16. The groove 15 may be of any cross section for engagement with an optical element. Examples of groove shapes used in the mounting of optical elements include V-grooves, U-grooves, and arcuate grooves.

Figure 7:
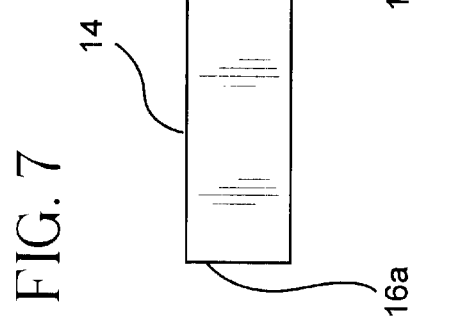
FIG. 7 is a side elevation view of an alternative embodiment of the submount shown in FIG. 1.

In another alternative embodiment, as shown in FIG. 7, the submount 12 has a polygonal cross section having a mounting surface 14 and a bonding surface 16a. The mounting surface 14 may be a planar surface, a curved surface, a grooved surface or any other type of surface that an optical element may be attached to. A planar surface is particularly suitable for the mounting of optical elements having a flat surface. The mounting surface 14 is inclined with respect to the bonding surface 16a. The bonding surface 16a is preferably a planar surface adapted for adhesive bonding to the alignment surface 20 of the support member 18. Preferably, the mounting surface 14 and the bonding surface 16a are perpendicular to one another.

Figure 8:
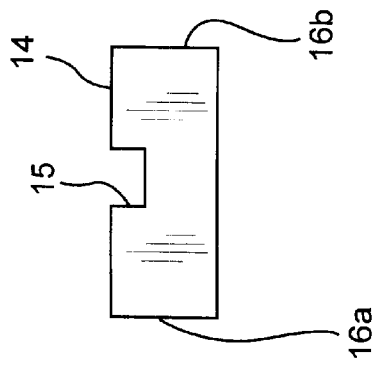
FIG. 8 is a side elevation view of an alternative embodiment of the submount shown in FIG. 1.

In another alternative embodiment, as shown in FIG. 8, the submount 12 has a polygonal cross section having a mounting surface 14 and a bonding surface 16a, wherein the mounting surface defines a groove 15. The groove 15 is configured for engagement with the optical element 28. The optical element 28 may include an alignment structure (not shown) that engages the groove 15 or the optical element 28 may itself engage that groove 15, such as, for example when the optical element 28 is a cylindrical ferrule for. Preferably, the groove 15 is located such that when the optical element 28 engages the groove 15 the optical axis of the optical element is parallel to the bonding surface 16a. The groove 15 may be of any cross section for engagement with an optical element. Examples of groove shapes used in the mounting of optical elements include V-grooves, U-grooves, and arcuate grooves.

Figure 9:
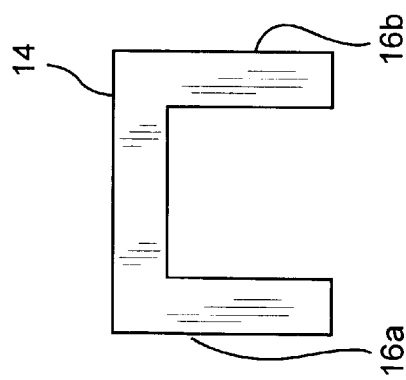
FIG. 9 is a side elevation view of an alternative embodiment of the submount shown in FIG. 1.

In another alternative embodiment, as embodied herein and as shown in FIG. 9, the submount 12 is a U-shaped member having a mounting surface 14 and two bonding surfaces 16a, 16b. Preferably the two bonding surfaces 16a, 16b are parallel planar surfaces. The mounting surface 14 may be a planar surface, a curved surface, a grooved surface or any other type of surface that an optical element may be attached to. A planar surface is particularly suitable for the mounting of optical elements having a flat surface; examples of which are prismatic lenses and certain types of thin film filters. The mounting surface 14 is inclined with respect to the two bonding surfaces 16a, 16b.

Figure 10:
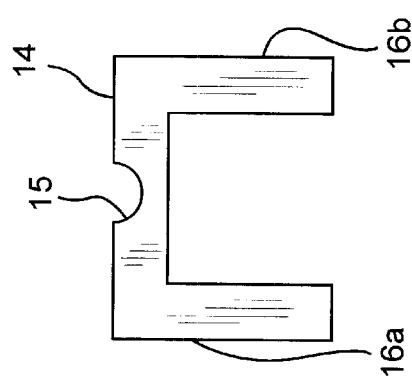
FIG. 10 is a side elevation view of an alternative embodiment of the submount shown in FIG. 1.

In another alternative embodiment, as embodied herein and shown in FIG. 10, the submount 12 is a U-shaped member having a mounting surface 14, and two bonding surfaces 16a, 16b. Preferably the two bonding surfaces 16a, 16b are parallel planar surfaces. The mounting surface 14 includes a groove 15. The groove 15 is preferably parallel to the two bonding surfaces 16a, 16b. The groove 15 may be of any cross section for engagement with an optical element. Examples of groove shapes used in the mounting of optical elements include V-grooves, U-grooves, and arcuate grooves.

The submount 12 may be made by machining and redrawing a glass shape in order to obtain components of a desirable size. Thus easily machined glass shapes may be reduced in cross sectional dimension to allow their use in small optical packages. It may be necessary to grind or polish either the mounting surface 14 or the bonding surface 16 or both to achieve the desired flatness or surface finish for these two surfaces.

Additionally, both or either of the submount 12 and the support member 18 may be made from porous Vycor® material, available from Corning Incorporated of Corning, N.Y. Using porous Vycor® material for either or both the submount 12 and the support member 18 allows the alignment structure 10 to function as a getter when used inside a laser package.

In an alternative embodiment, the optical element 28 may be directly coupled to the alignment surface 20. In this alternative embodiment, the optical element 28 includes a surface corresponding to the bonding surface 16 of the submount 12. Such a surface maybe, for example, the frame of a lens element. Thus the submount 12 is functionally replaced by the surface of the optical element 28.

Figure 11:
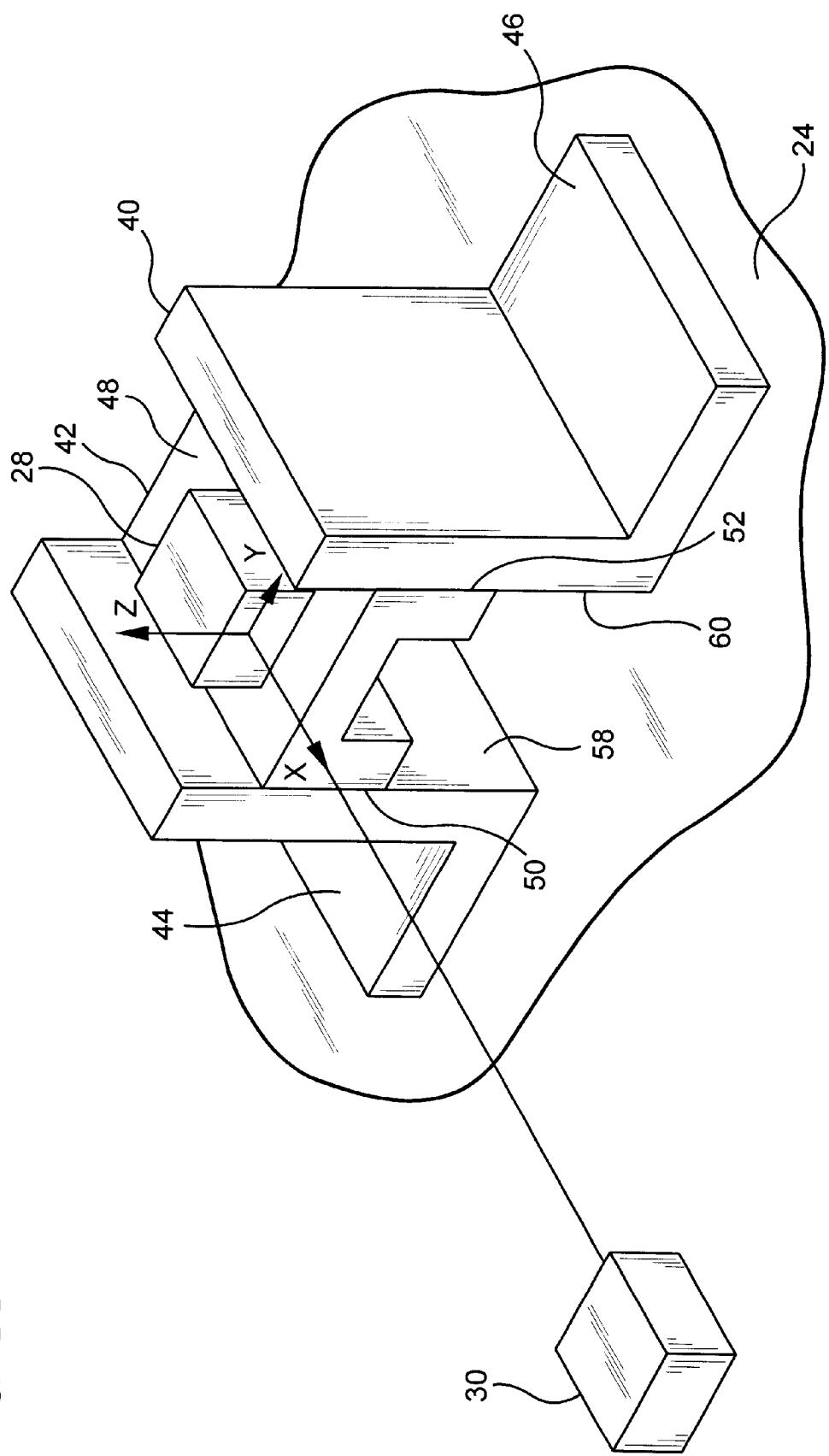
FIG. 11 is a perspective view of an alternative embodiment of the alignment structure of the present invention.
Figure 12:
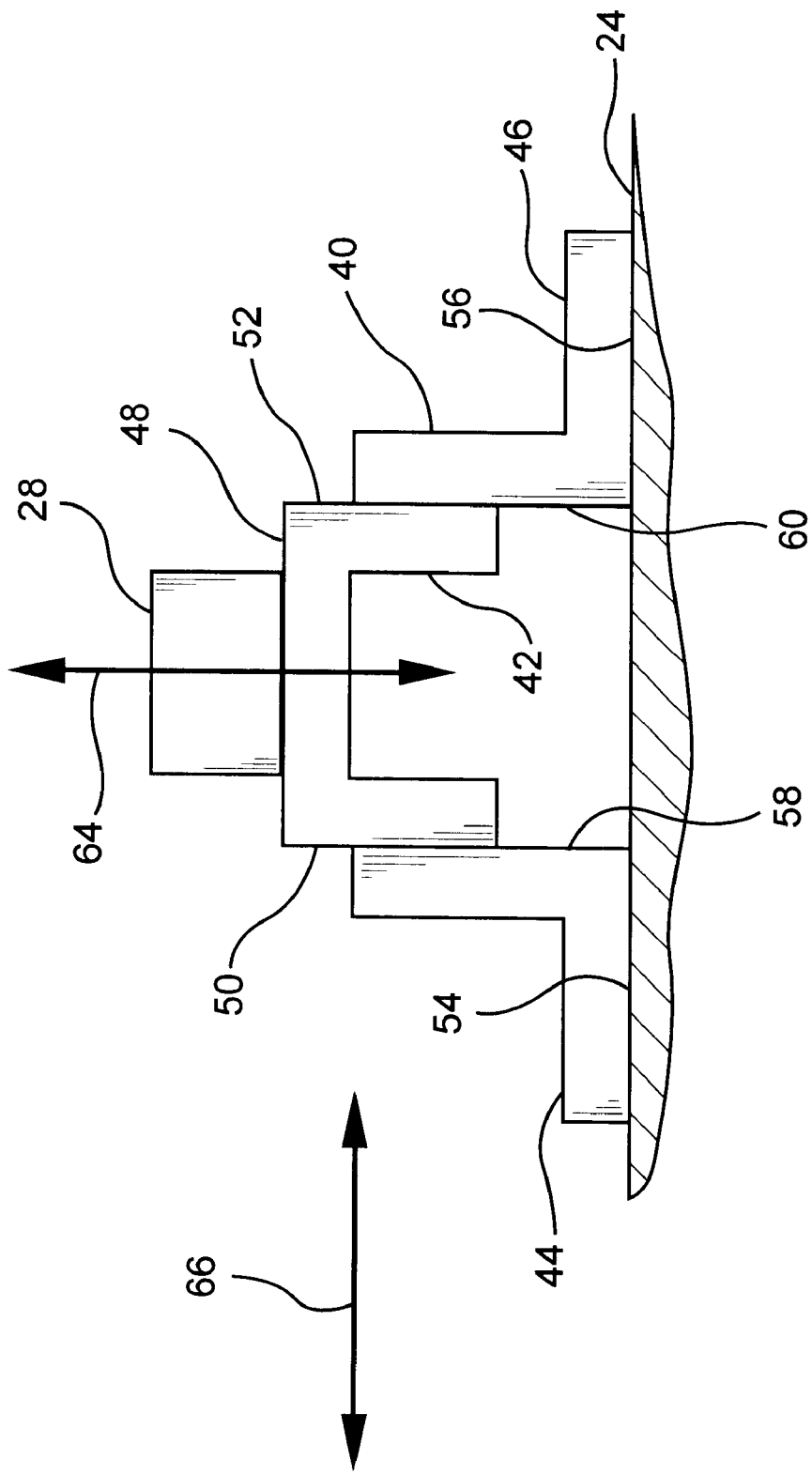
FIG. 12 is a front elevation view of the alignment structure shown in FIG. 11.
Figure 13:
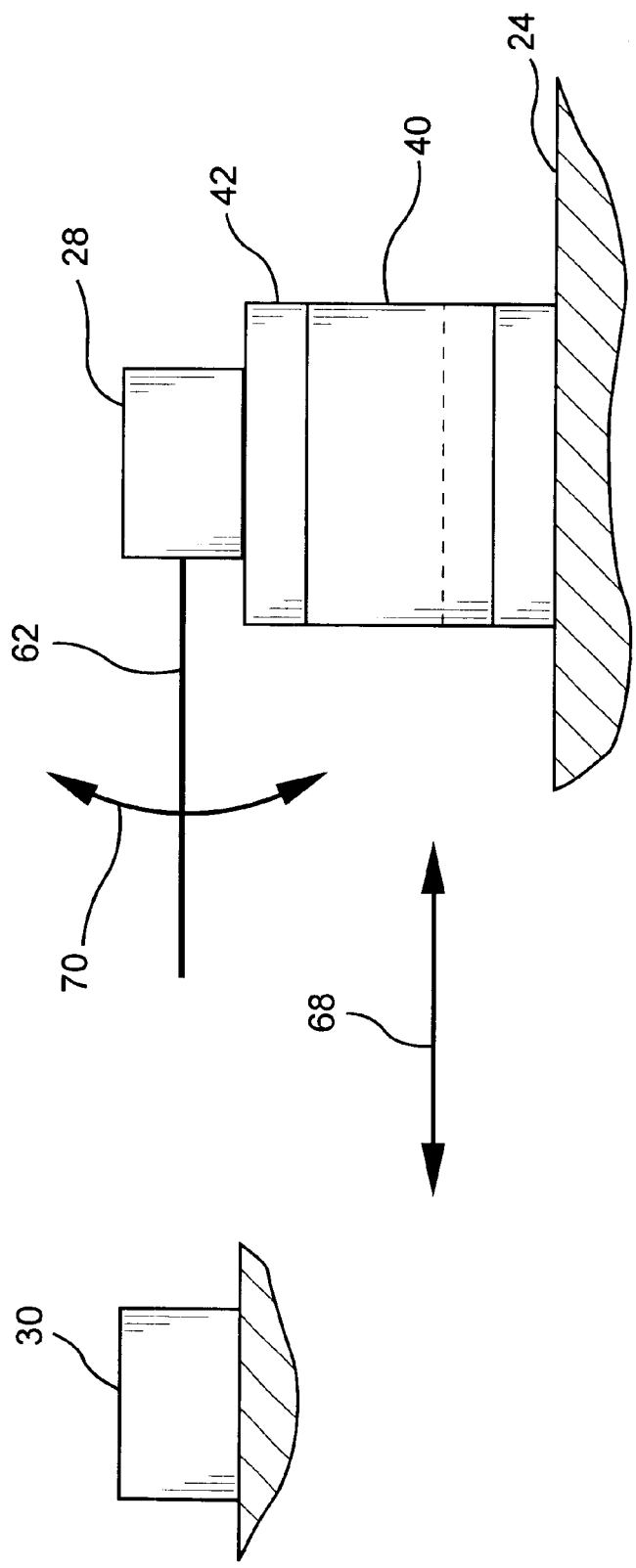
FIG. 13 is a side elevation view of the alignment structure shown in FIG. 11.
Figure 14:
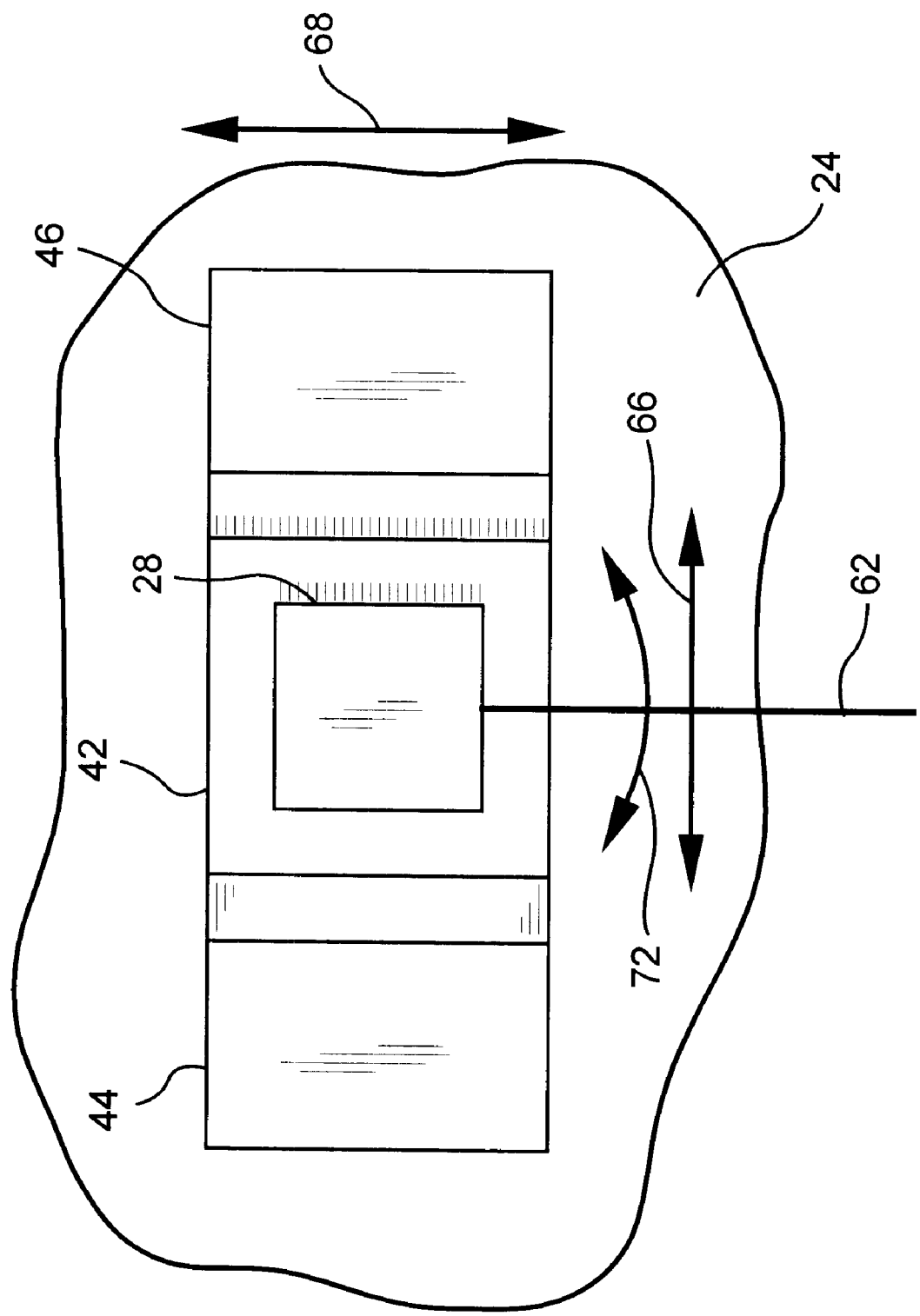
FIG. 14 is a top plan view of the alignment structure shown in FIG. 11.

As embodied herein and depicted in FIG. 11, the alignment structure 40 is a three piece assembly including a submount 42 and two support blocks 44, 46 used to position an optical element 28. The following description may be better understood by also referring to FIGS. 12, 13, and 14, which are, respectively, a front elevation view, a side elevation view and a top plan view of the alignment structure 40 illustrated in FIG. 11. The optical element 28 to be positioned by the alignment structure 40 is coupled to the mounting surface 48 of the submount 42. The coupling of the optical element 28 to the mounting surface 48 may be accomplished by a number of methods known to those skilled in the art including, for example, adhesive bonding, mechanical connection, using fasteners, using glass frits, soldering and welding.

The submount 42 is located between the two support blocks 44, 46. The submount 42 includes a mounting surface 48 and two bonding surfaces 50, 52. Preferably, the two bonding surfaces 50, 52 are parallel to one another and orthogonal to the mounting surface 48. In this embodiment the submount 42 is made from glass although it is envisioned that the submount 42 may be made from any one of a number of materials, including metals, plastics and ceramics, depending upon the design requirements of the alignment structure 40. The selection of the shape and material for the submount is a mere design choice easily made by those skilled in the art.

The embodiments of the submount 12 shown in FIGS. 7, 8, 9, and 10 may also find use as the submount 42 in the alignment structure 40. When used as a submount 42 the submounts 12 shown in FIGS. 7, 8, 9, and 10 also include a second bonding surface 16b. The second bonding surface 16b corresponds to the bonding surface 52 of FIG. 11. The second bonding surface 16b is substantially parallel to the bonding surface 16a.

Preferably, the support blocks 44, 46 or the submount 42 should be optically transparent. Alternatively the support blocks 44, 46 and the submount 42 may all be optically transparent. The optical transparency of the either the support blocks 44, 46 or the submount 42 to light allows the submount 42 be coupled to the support blocks 44, 46 by an optically initiated epoxy adhesive bond. The use of an light curable adhesive in this embodiment of the present invention allows the submount 42 to move with respect to the support blocks 44, 46 because in its uncured state the light curable adhesive is a liquid that allows the respective alignment surfaces and bonding surfaces to slide engage one another without binding while still maintaining enough cohesive force to keep the submount 42 coupled to the support blocks 44, 46.

Each of the support blocks 44, 46 includes an anchor surface 54, 56 and an alignment surface 58, 60. The alignment surfaces 58, 60 are substantially planar surfaces and preferably are orthogonal to the surface 24. Preferably the support blocks 44, 46 are positioned so that the alignment surfaces 58, 60 are substantially parallel with one another. The submount 42 is held in place between the alignment surfaces by an light curable adhesive preferably having a viscosity less than about 250 centipoise (cps), for example, UV15 adhesive, available from Master Bond Inc. of Hackensack, N.J. UV15 adhesive has a viscosity in the range from about 120 cps to about 150 cps.

Before the adhesive is cured by irradiating it with light of the appropriate wavelength and intensity, such as, for example ultraviolet light, the orientation of the optical element 28 may be adjusted to bring it into optical alignment with the stationary optical element 30. The orientation of the optical element 28 is adjusted by sliding the submount 42 in the X and Z directions and rotating the submount between the two alignment surfaces 58, 60. When the mounting surface 48 is orthogonal to the two bonding surfaces 50, 52 rotation of the submount 42 rotates the optical element 28 about an axis parallel to the Y-axis.

Preferably the surface 24 is a substantially planar surface allowing the alignment structure 40 to be moved about on it without changing the distance in the Z direction between the mounting surface 48 and the optical element (not shown) that the optical element 28 is to be aligned with. The anchor surfaces 54, 56 are configured to allow the support blocks to slide over the surface 24.

While the support blocks 44, 46 are shown as U-shaped members, the support blocks may also be rectangular blocks, L-shaped members or any other shape having a surface slidable on the surface 24 and positionable so as to allow the mounting surface 48 to vary in distance from the surface 24 and be variably inclined with respect to the surface 24.

In an alternate embodiment of the invention, as embodied herein and as shown in FIG. 15, the present invention includes a method for aligning optical elements designated generally throughout by reference numeral 100. The method 100 will be described with specific reference to the alignment structure 10 embodiment of the present invention shown in FIG. 1 and described above. Those skilled in the art, however, will appreciate that the method 100 is readily adaptable for use with the alignment structure 50 embodiment of the present invention shown in FIGS. 1 and 11 described above and is not limited to the detailed example provided below.

The method 100 includes a first step 110 of selecting the optical element to be aligned. Examples of optical elements requiring alignment with other optical elements included lenses, collimators, isolators, lasers, filters, circulators, and the ends of optical waveguide fibers.

The method 100 further includes the step 112 of coupling the optical element to a submount. The submount includes two non-parallel surfaces, a mounting surface and a bonding surface. Preferably the bonding surface and the mounting surface are substantially planar surfaces orthogonal to one another. Preferably the submount is transparent to light. The optical element is coupled to the mounting surface. The optical element may be coupled to the submount using techniques for mounting optical elements that are known to those skilled in the art. Examples of techniques employed by those skilled in the art to attach an optical element to a substrate include adhesive bonding, fusing, mechanical fastening, soldering and welding. Additionally, the optical element may be supported by a frame that is attached to the submount.

The method 100 further includes the step 114 of selecting a support block having at least two non-parallel surfaces. One of the two non-parallel surfaces, referred to as the anchor surface, is configured to be slidable and rotatable on a surface of an optical platform, for example an interior surface of a butterfly package for a laser. The other surface is referred to as the alignment surface and is configured for adhesive bonding to the bonding surface of the submount. Preferably the alignment surface and the anchor surface are substantially planar surfaces orthogonal to one another.

The method 100 further includes the step 116 of coupling the submount to the support block. The submount is coupled to the support block using a small volume of low viscosity adhesive. Preferably, the adhesive is an ultraviolet curable adhesive having a viscosity less than about 250 centipoise (cps) is preferable. An example of an ultraviolet curable adhesive that meets these requirements is UV15 adhesive, available from Master Bond Inc. of Hackensack, N.J. UV15 adhesive has a viscosity in the range from about 120 cps to about 150 cps. The submount is coupled to the support block by bringing the alignment surface of the support block and the bonding surface of the submount into close proximity and dispensing the light adhesive between the surfaces. Alternatively, the adhesive may be applied to either the bonding surface or the alignment surface before bringing the two surfaces into close proximity with one another. The capillary forces exerted by the adhesive are strong enough to pull the two surfaces close together (less than 10 micrometers of separation).

The method 100 further includes the step 118 of selectively manipulating the position of the submount and the support block. The optical element is aligned with another optical element so the two optical elements may engage in optical commnunication with one another. The optical elements are aligned with one another by sliding the anchor surface of the support block about the surface of the optical platform. This slidability of the support block with respect to the surface of the optical platform allows translation of the alignment structure in two directions (X and Y of FIG. 1). Furthermore, the alignment structure may be rotated about an axis (Z of FIG. 1) perpendicular to the surface of the optical platform.

The submount may be slid on the alignment surface in two directions (Z and X of FIG. 1) and rotated about an axis (Y of FIG. 1). When the anchor surface and the alignment surface are orthogonal to one another and the bonding surface and the mounting surface are orthogonal to one another the alignment structure possesses five degrees of Cartesian freedom for use in aligning the optical element.

The method 100 further includes the step 120 of fixing the position of the submount with respect to at least one other optical element. This step 120 is accomplished through irradiating the optical alignment structure with light of the appropriate wavelength and intensity to initiate curing of the adhesive. Because the support block and the submount are transparent to light the adhesive may be thoroughly cured without exposing the alignment structure to a distortion inducing thermal treatment.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method for mounting an optical element comprising the steps of:
    selecting an optical element;
    coupling the optical element to a submount;
    selecting a support block having at least two non-coplanar surfaces;
    coupling said submount to said support block thereby forming a mounting assembly;
    selectively manipulating the position of said submount and said support block to align said optical element so as to allow said optical element to engage in optical communication with at least one other optical element; and
    fixing the position of said submount and said support block with respect to the at least one other optical element.

2. The method of claim 1 wherein the step of coupling said submount to said base includes the steps of:
    bringing said base and said submount into close proximity to one another; and
    dispensing adhesive between said base and said submount.

3. The method of claim 1 wherein the step of selectively manipulating comprises the steps of:
    rotating said submount about a first axis;
    translating said submount along in a first plane;
    rotating said support block about a second axis wherein said second axis is not parallel to said first axis; and
    translating said support block in a second plane, wherein said second plane is inclined with respect to said first plane.

4. The method of claim 1 wherein the step of fixing further comprises the step of irradiating said mounting assembly with light of the appropriate wavelength and intensity to initiate curing of the adhesive.

5. An optical element mount made according to the method of claim 1.

6. A mount for an optical element comprising:
    a support member having:
        an anchor surface slidable on a surface; and
        an alignment surface disposed at an angle to said anchor surface; and
    a submount having:
        a mounting surface, wherein the optical element is coupled to said mounting surface; and
        a bonding surface disposed at an angle to said mounting surface and coupled said alignment surface of said support block.

7. The positioner of claim 6 wherein said submount is adhesively bonded to said support block.

8. The positioner of claim 6 wherein said submount is adhesively bonded to said support block with a light curable adhesive.

9. A mount for an optical element comprising:
    a submount having two parallel surfaces, wherein the optical element is coupled to said submount; and
    two support blocks disposed to slidably engage said two parallel surfaces,
    wherein said submount is rotatable about an axis perpendicular to said two parallel surfaces,
    wherein said submount may be rotated about two non-parallel axes and translated in three orthogonal directions, and wherein said submount is positioned to allow the optical element to engage in optical communication with at least one other optical element.

10. The mount of claim 9 wherein the positioning of said submount includes coupling said submount to said two support blocks and coupling said two support blocks to a substrate.

11. The mount of claim 10 wherein each of said two support blocks comprises:

an anchoring surface; and a mounting surface wherein said anchoring surface and said mounting surface are adjacent one another and said mounting surface is coupled to one of said two parallel surfaces and said anchoring surface is coupled to the substrate.

12. The mount of claim 11 wherein said anchoring surface of each of said two support blocks is bonded to said substrate and said mounting surface of each of said two support blocks is bonded to one of said two parallel surfaces.

13. The mount of claim 11 wherein said two support blocks are made of glass.

14. An optical device comprising:

a substrate, said substrate including a planar surface;

a support member including:

an anchor surface coupled to said planar surface, wherein before said anchor surface in coupled to said planar surface said support member is slidable and rotatable upon said planar surface; and an alignment surface, wherein said alignment surface is inclined with respect to said anchor surface; and an optical element having an optical axis, said optical element coupled to said alignment surface, wherein before said optical element is coupled to said alignment surface said optical element is slidable and rotatable upon said alignment surface;

wherein prior to coupling said optical element to said support member and coupling said anchor surface to said planar surface the optical axis of the optical element is positionable in five degrees of freedom.

15. A method for aligning the optical axes of two optical elements comprising the steps of:

providing a first optical element having a first optical axis;

providing a second optical element having a second optical axis;

providing a substrate, said substrate including a planar surface;

providing a support member, said support member slidable and rotatable upon said planar surface, wherein said support member includes an alignment surface;

coupling the first optical element to said alignment surface, wherein said first optical element is slidable along said alignment surface, wherein said first optical element is rotatable about an axis perpendicular to said alignment surface;

aligning the first optical axis with the second optical axis; and fixing the position said first optical axis with respect to said second optical axis;

wherein said step of aligning includes the steps of sliding said support member on said planar surface and rotating said support member about an axis perpendicular to said planar surface;

wherein said step of aligning further includes the steps of sliding the first optical element on said alignment surface and rotating the first optical element about an axis perpendicular to said alignment surface.

16. The method of claim 15 further including the steps of:

providing a submount; and coupling the first optical element to said submount;

wherein the step of coupling the first optical element to said alignment surface includes coupling said submount to said alignment surface.

17. The method of claim 16, wherein the step of coupling said submount to said planar surface includes placing adhesive between said submount and said planar surface;

wherein the step of coupling the first optical element to said alignment surface includes the placing adhesive between the first optical element and said alignment surface;

wherein the step of fixing the position said first optical axis with respect to said second optical axis includes optically initiating the curing of the adhesive.

18. The method of claim 17 wherein the step of coupling the first optical element to said alignment surface includes placing and adhesive between said submount to said alignment surface; and wherein the step of fixing the position said first optical axis with respect to said second optical axis includes optically initiating the curing of the adhesive.

* * * * *